United States Patent [19]

Ausprung

[11] 4,247,219
[45] Jan. 27, 1981

[54] FASTENING ELEMENT FOR DETACHABLY CONNECTING TWO PLATE-LIKE COMPONENTS

[75] Inventor: Erich Ausprung, Geislingen, Fed. Rep. of Germany

[73] Assignee: Springfix-Befestigungstechnik GmbH, Salach, Fed. Rep. of Germany

[21] Appl. No.: 22,352

[22] Filed: Mar. 20, 1979

[30] Foreign Application Priority Data

May 9, 1978 [DE] Fed. Rep. of Germany ....... 2820218

[51] Int. Cl.³ .............................................. F16B 19/00
[52] U.S. Cl. ................................... 403/406; 24/221 R
[58] Field of Search ............ 403/408, 406; 24/221 R, 24/221 A, 221 RC, 221 L, 221 K, 109; 85/5 R, 5 P

[56] References Cited

U.S. PATENT DOCUMENTS

| 3,182,770 | 5/1965 | Shemet | 85/5 R |
| 3,220,078 | 11/1965 | Preziosi | 24/221 K |
| 3,588,968 | 6/1971 | Heilman | 24/221 K |

FOREIGN PATENT DOCUMENTS 1295049 11/1972 United Kingdom ...................... 85/5 P Primary Examiner—Andrew V. Kundrat
Attorney, Agent, or Firm—O'Brien and Marks

[57] ABSTRACT

A fastening element for detachably connecting two plate-like components is disclosed as including a headpiece having a projection that can be passed through an elliptical hole in the first component and locked therein by rotating the element in one direction, and a square shaft opposite the headpiece that can be locked within a square hole in the second component by rotating the element in the opposite direction.

5 Claims, 7 Drawing Figures

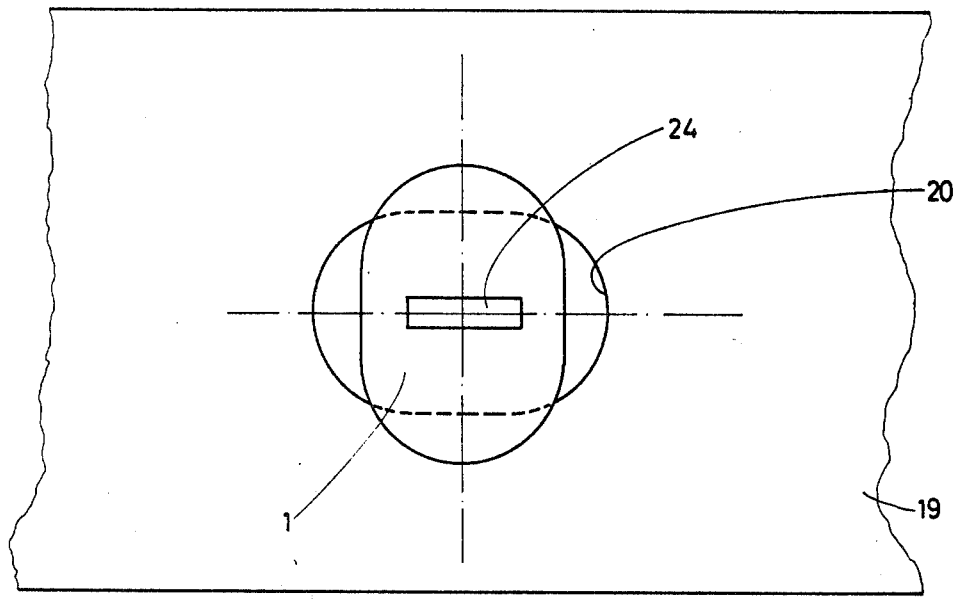
FIG. 5
FIG. 6
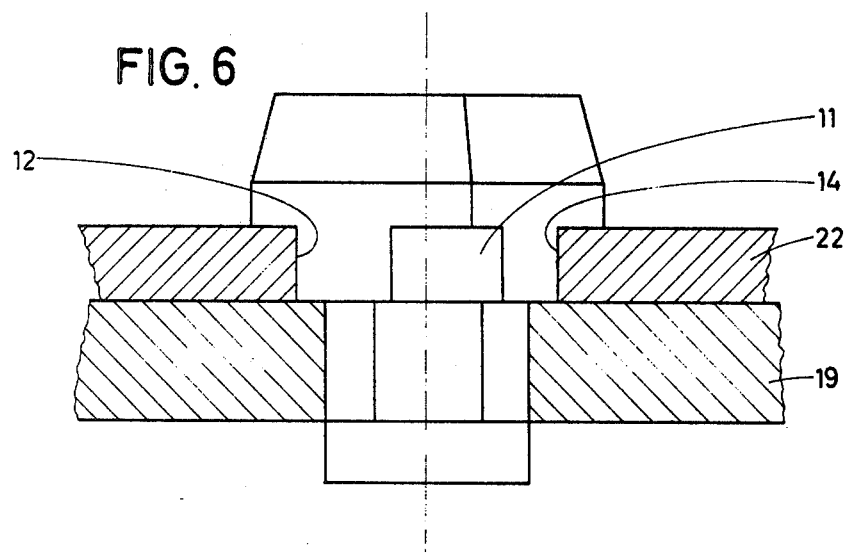

FASTENING ELEMENT FOR DETACHABLY CONNECTING TWO PLATE-LIKE COMPONENTS

The invention relates to a fastening element for detachably connecting two plate-like components provided with non-circular holes, through which holes the fastening element is passed and secured by rotation, wherein these components are held together by means of a projection which is arranged at each end of the fastening element and which engages behind the relevant component during the connection process.

The aim of the invention is to provide a fastening element of this kind which is arranged on the first component in pre-assembled form so that it cannot be lost, whereupon the fastening element which projects from the first component is passed through the hole in the second component. Then the two components must be connected to one another by rotating the fastening element.

This problem is solved by means of a fastening element comprising a headpiece which forms a front projection and which can be passed through the hole in the first component and extends into a rounded-off, first collar component which passes through the hole and which can be rotated in one direction in the hole up to a stop means arranged on the first collar component, to such an extent that the headpiece engages behind the first component and a non-circular shaft which adjoins the first collar component assumes a position in which it can be inserted into the hole in the second component, and that flattened portions of the shaft form a second stop means which is arranged in such manner that when the fastening element is rotated in the opposite direction up to the second stop means, the stationary parts of the shaft engage behind the second component by way of rear projection and the headpiece continues to engage behind the first component.

By way of assembly this fastening element is firstly inserted into the first component and rotated in one direction therein up to the first stop means, at which time the fastening element occupies a pre-assembled position on the first component in which it cannot be lost. Then the second component is placed over the shaft of the fastening element which projects away from the first component, whereupon, as a result of rotating back to the second stop means, the rear projection engages behind the second component. However, in this position the front projection still engages behind the first component, so that the two components are held together between the front and rear projections.

Expediently the hole in the first component is contrived to be an oblong hole and the hole in the second component is contrived to be a square hole in accordance with which the shaft is of square formation. The advantage of the oblong hole is that a headpiece shaped in this way can be rotated relative to the oblong hole by a relatively large angle without the headpiece disengaging from the first component. The square hole in combination with the correspondingly shaped square shaft has the advantage that flattened portions on the four edges of the square shaft form four projecting corners which represent the rear projection so that the second component is gripped from the rear at four points. Consequently the fastening element is able to absorb considerable forces via these four corners.

The use of the oblong hole enables the first collar component to be rotated by more than 90° relative to the oblong hole in one direction up to the first stop means and with the pre-assembled position occupied by the fastening element the headpiece engages behind the first component in an adequate range. Then the fastening element can easily be rotated backwards by an angle which enables the four stationary corners of the square shaft to satisfactorily engage behind the second component.

The second stop means of the square shaft are expediently arranged in such manner that when it abuts against the second stop means as a result of rotation in the opposite direction thus backwards rotation in the square hole, the first collar component still lies at an angle of approx. 90° relative to the oblong hole. This position means that, on account of the 90° angle, the range with which the headpiece engages behind the first component is particularly large so that even in this position the headpiece can absorb considerable forces.

The Figures illustrate an exemplary embodiment of the invention.

Figure 3:
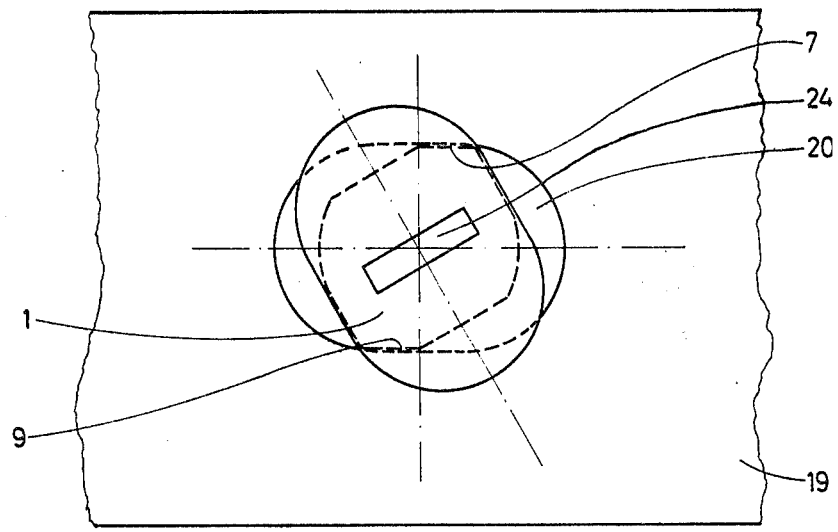
Figure 4:
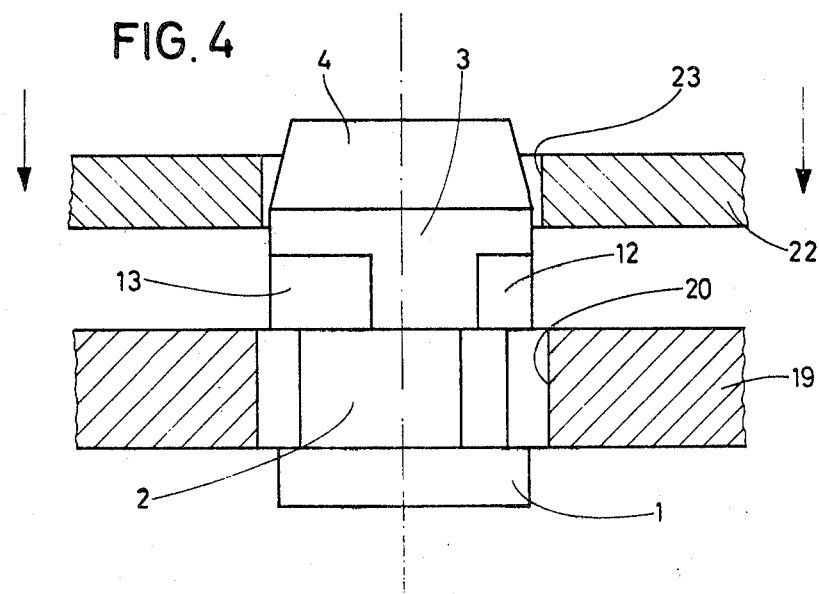
Figure 7:
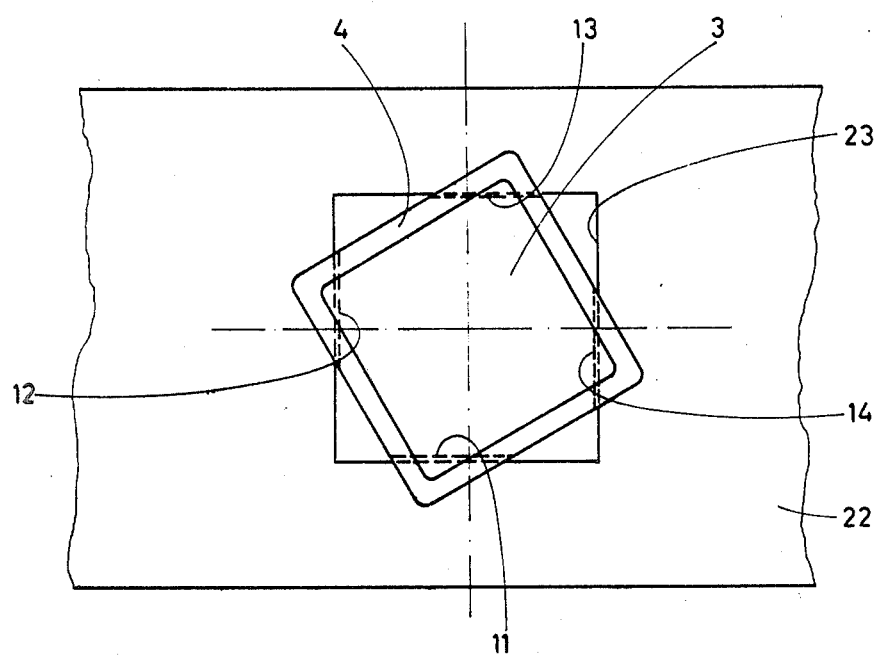

FIG. 3 is a plan view of the headpiece of the fastening element pre-assembled on the first component, FIG. 4 is a side view of the pre-assembled fastening element when it is passed through the second component, FIG. 5 is a plan view of the headpiece of the fastening element in its end position in which it connects the two components, FIG. 6 is a side view of the fastening element in the end position illustrated in FIG. 5 and FIG. 7 is a plan view of the end side of the shaft in the final position of the fastening element.

The fastening element illustrated in FIG. 1 comprises the headpiece 1 which, as front projection, is inserted through a correspondingly shaped hole in a first component, which will be explained in the following with reference to FIG. 4. The headpiece 1 extends to a first collar component 2 which can be rotated in the hole in the first component. The first collar component 2 is adjoined by the shaft 3 which here consists of a square shaft of square cross-section. The shaft 3 merges into a truncated pyramid 4 whose oblique surfaces serve merely to facilitate later insertion into the hole in the second component.

Figure 1:
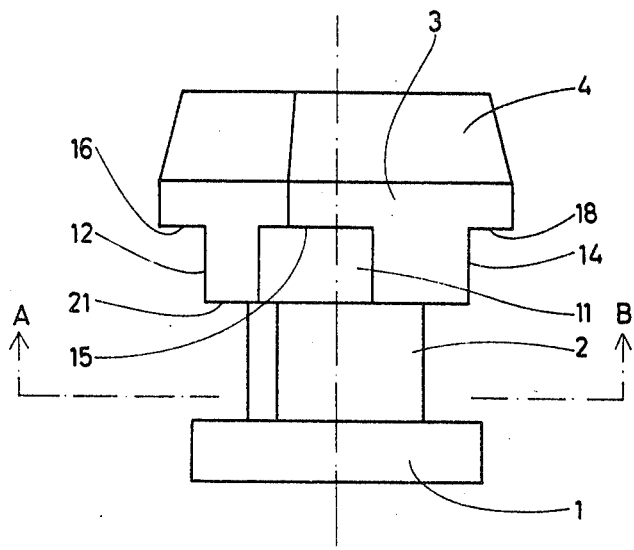
FIG. 1 is a side view of the fastening element.
Figure 2:
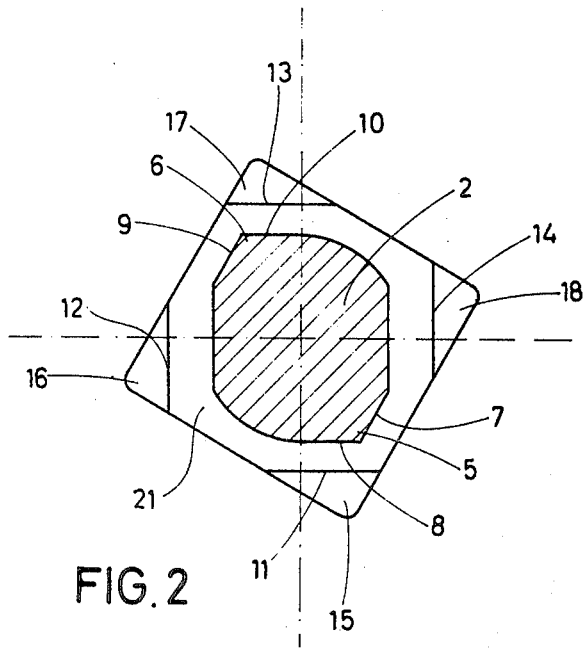
FIG. 2 is a section A-B in accordance with FIG. 1.

As can be seen from the section along the line A-B of FIG. 1, as shown in FIG. 2, the collar component 2 possesses the two extensions 5 and 6 which are delimited by surfaces 7/9 and 8/10 which form stop means. The effects of these stop means will be discussed in detail later in the description.

The shaft 3 is provided with flattened portions 11-14 which form the second stop means whose function will likewise be discussed in detail in the description. At the sides of the flattened portions 11-14 there remain the corners 15-18 which form the rear projection whose function will again be discussed at a later point.

FIG. 3 illustrates the first component 19 formed by a plate, the headpiece 1 of the fastening element having been previously passed through the hole 20. As can be seen, the hole 20 consists of an oblong hole to which the shape of the headpiece 1 is adapted. The headpiece 1 can thus be passed through the hole 20. The headpiece 1 finally assumes a position in which the component 19 precisely fills the interspace between headpiece 1 and shaft 3. In this position, which is illustrated in FIG. 4, the fastening element can be rotated relative to the component 19 in the oblong hole 20 until it reaches the position illustrated in FIG. 3 in which the surfaces 7/9, by way of first stop means, abut against the walls of the hole 20 preventing further rotation of the fastening element relative to the component 19. As can be seen, in the pre-assembled position illustrated in FIG. 3 the fastening element is rotated by 90° relative to the longitudinal axis of the oblong hole 20, i.e. the fastening element occupies an angle of more than 90° relative to the position of insertion, namely approx. 120° in accordance with FIG. 3. In this position the headpiece 1 passes over the edge of the oblong hole 20 and comes to rest against the first component 19. During this procedure the fastening element can only be rotated in one direction, namely in anticlockwise direction in accordance with FIG. 3, because when the fastening element is passed through the oblong hole 20, the surfaces 8 and 10 with which the extensions 5 and 6 are provided come into contact with the walls of the oblong hole preventing the fastening element from being rotated in a clockwise direction relative to the first component 19. This preventive measure is fundamentally due to the existence of the extensions 5 and 6, in the same way as the function of the first stop means.

In order to ensure that the fastening element which has been arranged in this way on the first component 19 is unable to slide backwards out of the first component 19, the cross-section of the square shaft 3 is selected to be such that, relative to the collar component 2, it forms a shoulder 21 which abuts against a surface of the first component 19 facing away from the headpiece 1. This ensures that when the pre-assembled fastening element is inserted in the first component 19, it is unable to slide through the latter and fall out.

FIG. 4 illustrates the fastening element in the pre-assembled state together with the first component 19, which latter is illustrated in section. In accordance with FIG. 4, the shaft 3 which projects away from the first component 19 is passed through the hole 23 in the second component 22. In accordance with the shaping of the shaft 3 as a square shaft, the hole 23 is likewise of square formation. In the illustrated pre-assembled state, the position of the shaft 3 is such that when the second component 22 occupies a given position it can be easily moved over the shaft 3. The second component 22 is then moved over the shaft 3 until it comes into contact with the first component 19.

FIG. 6 illustrates the joined position of the two components 19 and 22 in which, however, the fastening element is rotated backwards by approx. 30° in accordance with the position in FIG. 4. This position can be seen clearly from FIG. 5 which shows the headpiece 1 engaging over the first component 19. Now the headpiece 1 is only rotated by 90° relative to the position in which it was previously conducted through the oblong hole 20. As can be seen, the headpiece 1 engages over the edge of the oblong hole 20 over a considerable area so that the headpiece 1 is able to absorb considerable forces which tend to separate the two components 19 and 22.

When the fastening element is rotated backwards into the position shown in FIG. 5, the corners 15–18 of square shaft 3 engage over the second component 22 so that the two components 19 and 22 are held together on the one hand via the corners 15–18 and on the other hand via the headpiece 1. Relative to the component 22 the square shaft 3 now occupies the position shown in FIG. 7 which illustrates the component 22 with its square hole 23 and the end side of the square shaft 3. As will be apparent, the square shaft 3 is rotated relative to the square hole 23 and in fact to such an extent that the flattened portions 11–14 are in contact with the walls of the square hole 23. Thus the second stop means formed by the flattened portions 11–14 prevent the fastening element from rotating further backwards so that it is secured in the holes 20 and 23 of the two components 19 and 22. The fastening element is prevented from rotating into the position illustrated in FIG. 3 by the friction of the fastening element vis-a-vis the components 19 and 22. FIGS. 3 and 5 also illustrate an operating slot 24 which is inlet into the headpiece 1 and through which it is possible to insert a screwdriver in order to rotate the fastening element. The other Figures do not show this operating slot 24 in order to simplify the drawing.

The two components 19 and 22 are in this case plates. It is naturally also possible to connect other components to one another in the manner illustrated. The only requirement is that the two components should be able to be placed against one another and posses parallel surfaces to one another.

In the case of the above described exemplary embodiment the hole in the first component is an oblong hole and the hole in the second component is a square hole. It is also possible to use other non-circular hole shapes, although it should be ensured that when the fastening element is rotated in the holes its front and rear projections satisfactorily engage over the relevant components. The illustrated exemplary embodiment is, however, a particularly advantageous form as the oblong hole in the first component results in a sufficiently large angle of rotation and the square hole and corresponding square shaft allow the second component to be gripped at four points.

I claim:

1. A fastening element for detachably connecting two plate-like components which are provided with non-circular holes, through which holes the fastening element is passed and secured by rotation, wherein these components are held together by means of a projection which is arranged at each end of the fastening element and which engages behind the relevant component during the rotation, characterized by a headpiece (1) which forms a front projection and which can be passed through the hole (20) in the first component (19) and adjacent to which a rounded collar (2) is provided which passes through the hole (20) and which can be rotated in one direction in the hole (20) up to a first stop means (7, 9) which is arranged on the collar (2) so that the headpiece (1) engages behind the first component (19), and a non-circular shaft (3) which adjoins the collar (2) and can be inserted into the hole (23) of the second component (22), a portion of the shaft (3) having projections (15, 16, 17, 18) thereon, and that flattened portions of the shaft (3) form a second stop means (11, 12, 13, 14) which is positioned in such manner that when the fastening element is rotated in the opposite direction to the second stop means (11, 12, 13, 14), the projections (15, 16, 17, 18) of the shaft (3) engage behind the second component (22) and the headpiece (1) remains engaged behind the first component (19).

2. Fastening element as claimed in claim 1, characterised in that the hole (20) in the first component (19) is an oblong hole and the hole (23) in the second component (22) is a square hole, and the shaft (3) consists of a correspondingly, shaped square shaft.

3. Fastening element as claimed in claim 2, characterised in that the collar component (2) can be rotated by more than 90° relative to the oblong hole (20) in one direction up to the first stop means (7, 9).

4. Fastening element as claimed in claim 3, characterised in that when it abuts against the second stop means (11, 12, 13, 14) in the square hole (23) as a result of rotation in the opposite direction, the collar component (2) still assumes an angle of approx. 90° relative to the oblong hole (20).

5. Fastening element as claimed in claims 2, 3 or 4, characterised in that the flat width of the square shaft (3) is such that it forms a shoulder (21) vis-a-vis the collar component (2) which shoulder abuts against the first component (19) on the side thereof facing away from the headpiece (1).

* * * * *